United States Patent
Shi et al.

(10) Patent No.: US 9,756,615 B2
(45) Date of Patent: Sep. 5, 2017

(54) TTI SWITCHING

(71) Applicant: Telefonaktiebolaget L M Ericsson (publ), Stockholm (SE)

(72) Inventors: Nianshan Shi, Järfälla (SE); Alessandro Caverni, Stockholm (SE); Billy Hogan, Sollentuna (SE); Waikwok Kwong, Solna (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 573 days.

(21) Appl. No.: 14/354,863

(22) PCT Filed: Apr. 10, 2014

(86) PCT No.: PCT/SE2014/050443
§ 371 (c)(1),
(2) Date: Apr. 28, 2014

(87) PCT Pub. No.: WO2014/189430
PCT Pub. Date: Nov. 27, 2014

(65) Prior Publication Data
US 2016/0316464 A1 Oct. 27, 2016

Related U.S. Application Data (60) Provisional application No. 61/825,751, filed on May 21, 2013.

(51) Int. Cl.
*H04W 72/14* (2009.01)
*H04W 72/04* (2009.01)
(Continued)

(52) U.S. Cl.
CPC ....... *H04W 72/0406* (2013.01); *H04W 28/16* (2013.01); *H04W 72/0446* (2013.01); *H04W 72/14* (2013.01); *H04W 88/12* (2013.01)

(58) Field of Classification Search
None
See application file for complete search history.

(56) References Cited

U.S. PATENT DOCUMENTS

2006/0056355 A1 3/2006 Love et al.
2007/0104150 A1 5/2007 Fernandez-Corbaton et al.
(Continued)

FOREIGN PATENT DOCUMENTS

WO 2011143674 A1 11/2011
WO 2013020651 A1 2/2013

OTHER PUBLICATIONS

Unknown, Author, "2ms/10ms TTI Switching", 3GPP TSG-RAN WG2#46, R2-050566, Lucent Technologies, Scottsdale, Arizona, USA, Feb. 14-18, 2005, pp. 1-3.
(Continued)

*Primary Examiner* — Sulaiman Nooristany
(74) *Attorney, Agent, or Firm* — Murphy, Bilak & Homiller, PLLC (57) ABSTRACT

A radio network controller, RNC, keeps control of how many users to configure on a first transmission time interval, TTI, and how many to configure on a second TTI. For example, a method, performed by the RNC, for configuring at least one radio bearer between a radio base station, RBS, and wireless communication devices. The method comprises receiving, from the RBS, a request to perform a TTI switch according to a TTI switch trigger received by the RBS. The received request is analyzed and a grant to perform the requested TTI switch is sent to the RBS.

15 Claims, 5 Drawing Sheets

(51) Int. Cl.
    *H04W 28/16*     (2009.01)
    *H04W 88/12*     (2009.01)

(56) References Cited

U.S. PATENT DOCUMENTS

| | | | |
|---|---|---|---|
| 2009/0034474 A1* | 2/2009 | Yavuz | H04L 1/0007 370/331 |
| 2009/0034475 A1* | 2/2009 | Runyon | H01Q 1/42 370/331 |
| 2011/0116563 A1 | 5/2011 | Vitthaladevuni et al. | |
| 2012/0250644 A1* | 10/2012 | Sambhwani | H04W 72/0413 370/329 |
| 2012/0300636 A1 | 11/2012 | Wang et al. | |
| 2013/0128780 A1 | 5/2013 | Terry et al. | |
| 2014/0328260 A1 | 11/2014 | Papasakellariou et al. | |

OTHER PUBLICATIONS

Unknown Author, "Coverage improvements for Further EUL Enhancements", 3GPP TSG-RAN WG2 #82 R2-131685 Fukuoka, Japan Source: Ericsson, ST-Ericsson, May 20-24, 2013, 1-4.

\* cited by examiner

TTI SWITCHING

TECHNICAL FIELD

Embodiments herein relate to a wireless communication system, and more specifically to managing transmission time interval switching in a wireless communication system.

BACKGROUND

Many wireless communication systems now support multiple kinds of services, including for instance circuit switched voice services, packet data services, high data rate services, etc. These different services have very different characteristics. Moreover, different applications using the same general service may nonetheless impose different demands on that service. For instance, an internet browsing application may be supported by a packet data service that has a variable delay and throughput, while a multimedia streaming application may be supported by a packet data service having a relatively constant average throughput and low delay.

A wireless communication system supports these varying services through the use of radio bearers. A radio bearer supports the transfer of user data over a radio connection between a wireless communication device and a base station with defined data transfer characteristics (e.g., with a defined quality of service, QoS). Different radio bearers are configured to provide different defined transfer characteristics.

Under some circumstances, though, the configuration or state of a given radio bearer may need to be changed, e.g., in order to optimize the radio bearer for the current requirements of the wireless communication device. A change in the configuration or state of a radio bearer involves, as non-limiting examples in a context where the system is a High Speed Packet Access (HSPA) system, adding or removing the radio bearer, moving the radio bearer between a dedicated physical channel (DPCH) and enhanced uplink (EUL)/high speed (HS), changing the spreading factor and/or bit rate, and/or adding or removing connection capabilities (e.g., EUL 2 ms/10 ms transmission time interval (TTI), Dual Cell or multi-carrier, 64 quadrature amplitude modulation (64QAM), multiple-input multiple-output (MIMO), continuous packet connectivity (CPC), downlink (DL) enhanced layer 2 (L2), uplink (UL) improved L2).

Consider the specific example of a radio bearer configuration change relating to a change in the TTI of a radio bearer (i.e. a TTI switch). The TTI is a radio bearer parameter that defines the interval of time in which a transmission occurs over the air interface. In some systems, for instance, a set of one or more so-called transport blocks are fed from a medium access control (MAC) layer to the physical layer, and the TTI is the time it takes to transmit that set of one or more transport blocks over the air interface.

Regardless, a longer TTI (e.g., 10 ms or above) proves more robust in the face of poor channel conditions. On the other hand, a shorter TTI (e.g., 2 ms) reduces latency, which is required to provide good end-user experience when supporting mobile broadband services. Because of this, it is desirable to use a shorter TTI over as wide an area as possible. However, at least in current third generation (3G) networks, a substantial number of large macro cells still exist. With a macro cell being so large, it generally proves challenging for the cell to support a TTI as short as 2 ms over its entire coverage area. In such environments, it may be necessary to fall back to a longer TTI, e.g., 10 ms, when a wireless communication device approaches the cell boundary. This however requires that a radio bearer configuration change is triggered when the device approaches the cell boundary, and that the change is applied.

In the current third generation partnership project (3GPP) specifications (i.e. up to Rel-11, meaning Release-11), when enhanced dedicated channel (E-DCH) is used in CELL_DCH state, it is the radio network controller (RNC) that configures if a user should operate on 2 ms TTI or 10 ms TTI.

During the ongoing 3GPP Rel-12 (meaning Release-12) discussion, with particular regard to the Study Item "Study on Further EUL Enhancements", several methods are being evaluated, aimed at increasing the EUL coverage especially for 2 ms TTI operations.

SUMMARY

In order to at least mitigate drawbacks as discussed above, there is provided in different embodiments a method performed by a RNC, a method performed by a radio base station (RBS) and corresponding RNC, RBS, computer program and carrier.

However, before summarizing these embodiments, it is to be noted that in U.S. 61/758,622, filed Jan. 30, 2013, some enhancements were described, based on improved measurements and faster and more robust switching. Regarding the latter, one possible improvement relies on a switch decision (for instance from 2 ms to 10 ms TTI) taken autonomously by the NodeB (noting that NodeB is an example of a RBS), allowing for a faster reconfiguration of the TTI. Unlike the existing reconfiguration procedures for EUL TTI switch, it would hence not be the RNC to take the decision but the NodeB.

In the current 3GPP specification, since the TTI switch decision is taken by the RNC, the RNC knows in advance if the data being sent on E-DCH resource by the user equipment (UE, noting that UE is an example of a wireless communication device) is transmitted on 2 ms or 10 ms TTI and also knows how many users are transmitting on 2 ms or 10 ms TTI.

The RNC needs this information for different purposes:
1. The characteristics and performance requirement for the 10 ms and 2 ms TTI are quite different due to the difference in TTI length. The RNC, therefore, needs to know in advance whether the UE will switch the TTI in order to correctly configure or reconfigure the user plane on the interface between the NodeB and RNC so as to be able to transfer data to the upper layer in a consistent way.
2. The RNC may use the information to estimate the relative utilization between the two TTIs and determine, by means for instance of admission control policies, the maximum number of 2 ms TTI users and the maximum number of 10 ms TTI users admitted to utilize E-DCH resources at the same time. This allows the RNC to dynamically manage the resources needed by E-DCH traffic in the cell.

With the introduction of a NodeB autonomous decision as proposed in U.S. 61/758,622, the RNC would still be able to keep track of the number of users that have undergone the TTI reconfiguration, but it would no longer be able to control how many users to put on the 2 ms and how many on the 10 ms TTI.

Embodiments herein provide means for the RNC to keep control of how many users to configure on 2 ms TTI and how many on 10 ms TTI.

In other words in a first aspect there is provided a method, performed by a radio network controller, RNC, for configuring at least one radio bearer between a radio base station, RBS, and wireless communication devices. The method comprises receiving, from the RBS, a request to perform a TTI switch according to a TTI switch trigger received by the RBS. The received request is analysed and a grant to perform the requested TTI switch is sent to the RBS.

In a second aspect, there is provided a method, performed by a radio base station, RBS, for configuring at least one radio bearer between the RBS and wireless communication devices. The method comprises receiving, from a wireless communication device, any of a TTI switch trigger that indicates a request from the wireless communication device to switch from operating a radio bearer using a first TTI to operating a radio bearer using a second TTI, a TTI switch trigger that indicates a request from the wireless communication device to switch from operating a radio bearer using the second TTI to operating a radio bearer using the first TTI. A request to perform a TTI switch according to the received TTI switch trigger is then sent to a RNC. A grant to perform the requested TTI switch is then received from the RNC, and the requested TTI switch is performed.

In further aspects, a corresponding RNC, a corresponding RBS and computer programs are provided, as will be described in detail below.

Also provided are additional means for the RNC and the NodeB to be synchronized regarding the amount of 2 ms and 10 ms TTI resources that can be autonomously allocated by the serving NodeB.

These high level mechanisms can be used for this purpose as will be summarized below. It is to be noted that, in the following, reference will be made to a controlling RNC (CRNC), a serving RNC (SRNC) as well as to a RNC. As the skilled person will realize, a CRNC is a RNC that is responsible for an overall control of resources of access points (such as a NodeB) in a radio access network (RAN) and a SRNC is a RNC that handles a connection to one wireless communication device (i.e. it is the entity that terminates the MAC-d protocol). In many typical realizations of RANs, the functionalities of CRNC and SRNC are co-located. Consequently, in the present context, a RNC can be seen as a combined CRNC/SRNC.

In a first embodiment:
1. NodeB transmits a request to the CRNC for permission to do TTI autonomous switching.
2. CRNC transmits to NodeB which TTI type is granted.
3. NodeB transmits an indication to the UE and CRNC/SRNC informing of the TTI switching execution.

In a further embodiment, a NodeB is configured to communicate with a UE. A UE TTI switch is triggered. The NodeB receives a TTI switch trigger from the UE. The NodeB transmits a request to the RNC, comprising a request to determine whether the TTI switch is allowable. The RNC performs admission check based on the request. The NodeB receives a granted TTI from the RNC. The NodeB transmits the TTI switch to the UE. The NodeB transmits the TTI switch to the RNC, such that the RNC can maintain a TTI record.

In a further embodiment, a UE is served by a NodeB. The NodeB is connected to an RNC. The UE transmits a TTI switch trigger to the NodeB. The NodeB may transmit a request to the RNC, comprising a request to determine whether the TTI switch is allowable. The RNC performs admission check based on the request. The NodeB receives a granted TTI from the RNC. The UE receives a TTI switch execution from the NodeB, based on the granted TTI received from the RNC.

DETAILED DESCRIPTION

Figure 1:
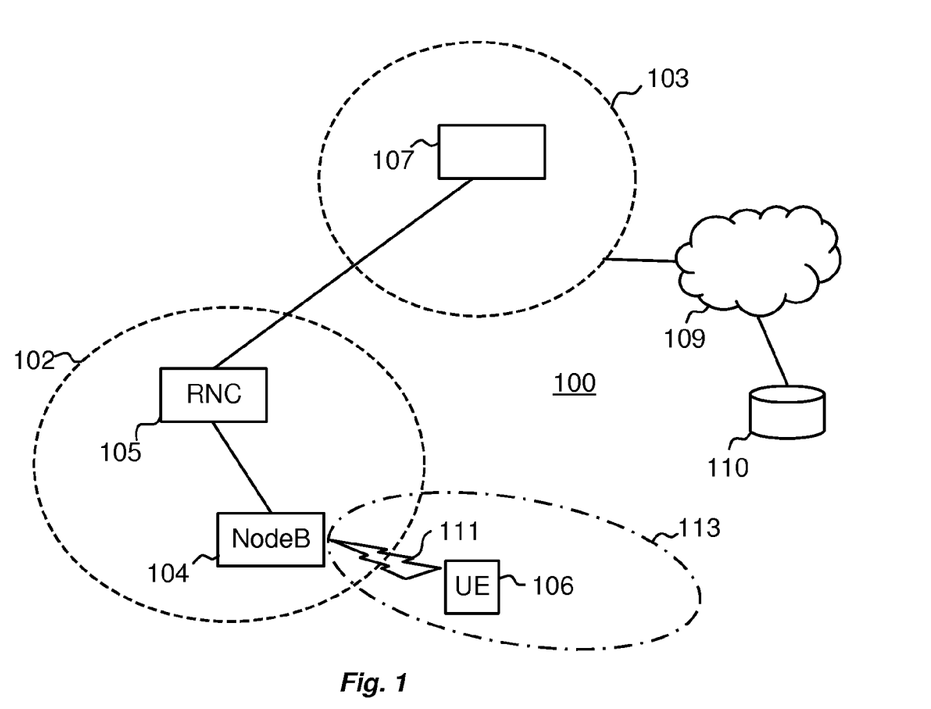
FIG. 1 is a schematic block diagram of a wireless communication system.

FIG. 1 illustrates schematically an exemplifying wireless communications system 100 in which embodiments herein may be implemented. The wireless communications system 100 may be any 3GPP wireless communication system, such as a Universal Mobile Telecommunication System (UMTS) Wideband Code Division Multiple Access (WCDMA) network, a Global System for Mobile communication (GSM), or the like. The wireless communication system 100 may even be an evolution of any one of the aforementioned systems or a combination thereof.

The wireless communication system 100 may comprise a number of different nodes distributed in a radio access network 102 and a core network 103.

Nodes in the radio access network 102 may be denoted "radio network node" and, for example, refer to a Base Station (BS), a Base Transceiver Station (BTS), a Radio Base Station (RBS), a Remote Radio Unit (RRU), an access point, a NodeB in 3G networks, evolved NodeB (eNodeB or eNB) in Long Term Evolution (LTE), networks, or the like. In UMTS Terrestrial Radio Access Network (UTRAN) networks, a node may also be a RNC. Furthermore, in Global System for Mobile Communications, GSM, EDGE Radio Access Network, GERAN, where EDGE is short for Enhanced Data rates for GSM Evolution, the term "radio network node" may also refer to a Base Station Controller (BSC).

As FIG. 1 shows, a RNC 105 may be connected to other nodes in the system, exemplified here by a NodeB 104 in the radio access network 102 and connected to an entity 107, such as any entity in the core network 103 and further nodes, such as node 110 in another network 109. It is to be noted, however, that any details regarding communication with such entities is outside the scope of the present disclosure.

A number of wireless communication devices may be operating in the system 100. One such wireless communication device 106 is shown being in connection via a radio interface 111 with a NodeB 104 in the radio access network 102. The wireless communication device 106, and typically many other wireless communication devices (not shown), are located in a cell 113 that is under the control of the NodeB 104. As used herein, the term "wireless communication device" may refer to a user equipment, UE, a subscriber unit, mobile phone, a cellular phone, a Personal Digital Assistant, PDA, equipped with radio communication capabilities, a smartphone, a laptop or personal computer, PC, equipped with an internal or external mobile broadband modem, a tablet PC with radio communication capabilities, a portable electronic radio communication device or the like.

As will be described in some detail in the following, focus will be made on communication between a RNC, a NodeB and a UE.

Figure 2:
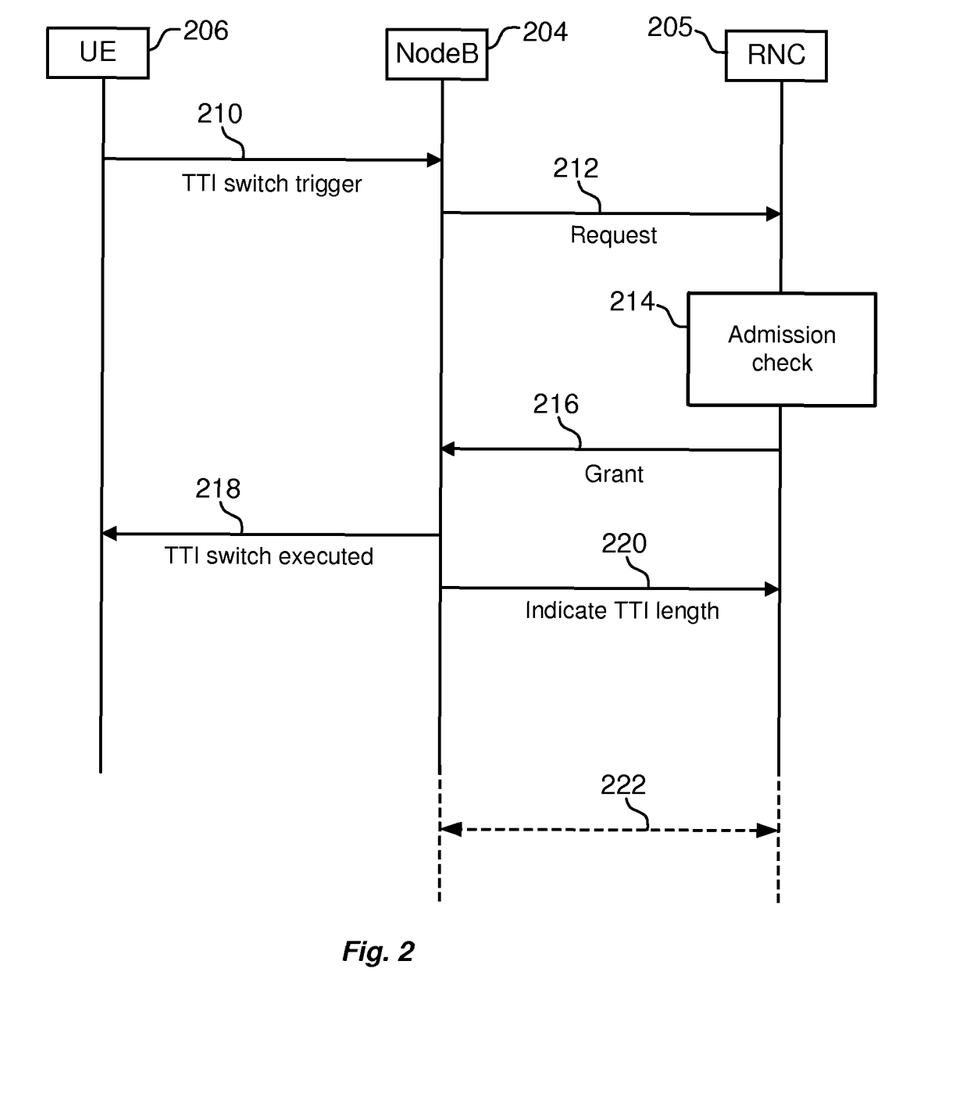
FIG. 2 is a combined flow chart and signaling diagram.
Figure 3:
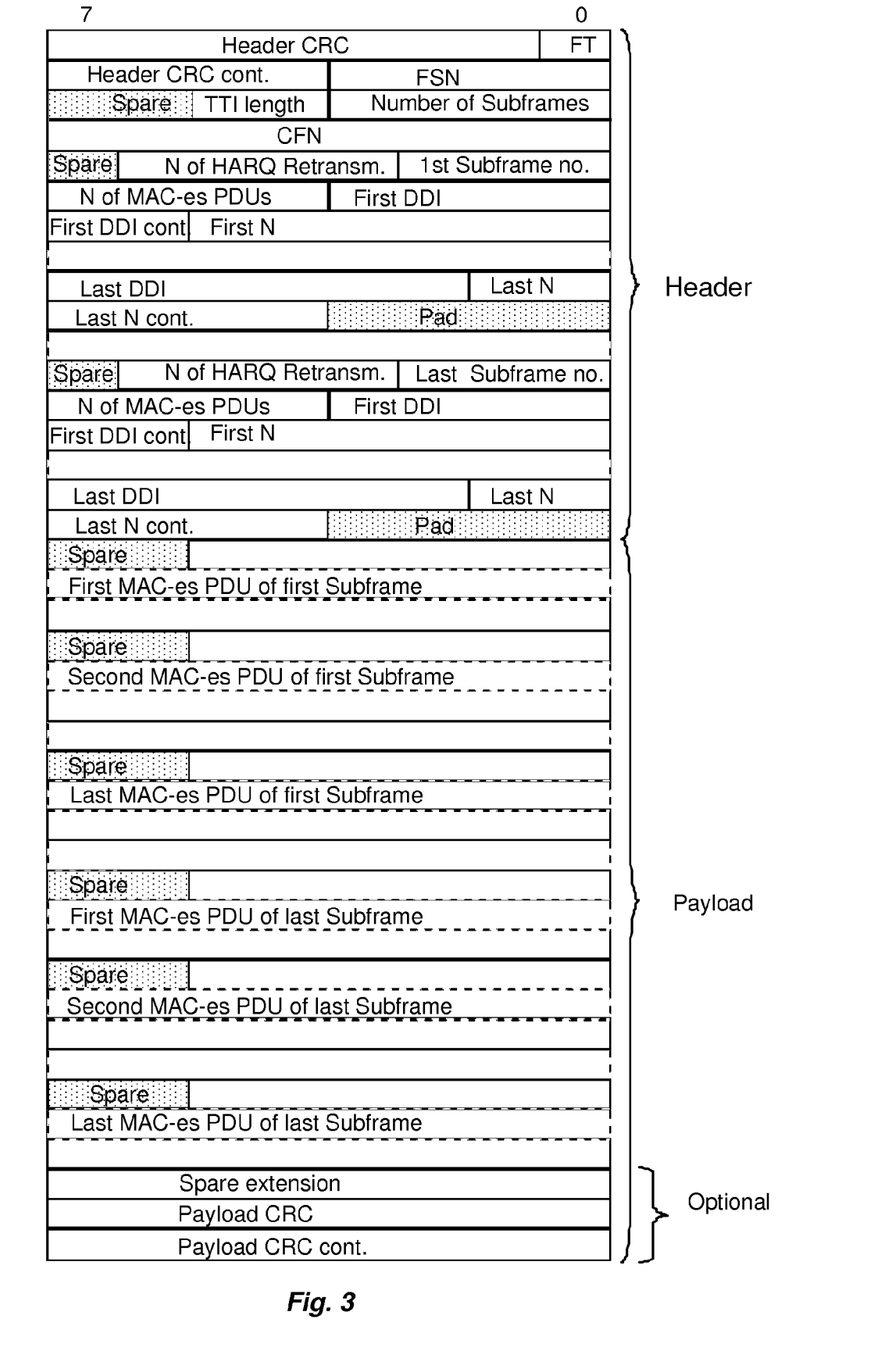
FIG. 3 illustrates contents of a data frame.

Turning now to FIGS. 2 to 3, embodiments of methods will be described in some detail, remembering that the term "user" is equivalent to "wireless communication device".

During the setup of E-DCH channels, The CRNC used to decide how the resource for each TTI configuration should be allocated. With NodeB autonomous TTI switching, the CRNC instead configures how many 2 ms and 10 ms TTI serving users the NodeB is allowed to setup and/or switch to (serving users are users having this cell as their serving cell).

Solution A:

When the TTI Switching is triggered, the NodeB will request the CRNC for the permission for the requested TTI. A new Dedicated NBAP message carrying the TTI request information is sent from the NodeB to the CRNC. The information may be given as:
Permission Request for 2 ms TTI.
Permission Request for 10 ms TTI.
Radio Link Identity (for example E-DCH RL ID).
Any other quantities that may convey the same information. Other types of identity may be used.

The CRNC will send response to the NodeB if the UE is granted to 2 ms TTI or 10 ms TTI. A new Dedicated NBAP message carrying the TTI grand information is sent from the CRNC to the NodeB. The information may be given as:
Permission granted/reject for 2 ms TTI.
Permission granted/reject for 10 ms TTI.
Radio Link Identity (for example E-DCH RL ID).
Any other quantities that may convey the same information (for example: the granted TTI), other types of identity may be used.

Alternatively, an existing NBAP message (for example NBAP: RADIO LINK PARAMETER UPDATE INDICATION) may be extended to include the above TTI switching permission request information.

A new message can be introduced to convey the TTI switching permission response, sent from CRNC to the NodeB.

Alternatively, a new or an existing user plan control frame can be used to carry the information.

The NodeB should notify the CRNC/SRNC about the TTI switching decision. The existing Iub/Iur Frame Protocol can be extended to include the TTI length indication. Alternative, new or existing control Plane messages can be used to carry the information.

This method is illustrated in FIG. 2 and table 1 and table 2. In the example, NBAP of TS 25.433 (chapter 9.1.89) "RADIO LINK PARAMETER UPDATE INDICATION" is extended.

A new IE group is introduced as "TTI Switching Permission Request", as in table 1. As an example, a new NBAP message to TS 25.433 "RADIO LINK PARAMETER UPDATE" is introduced. It carries the granted TTI information as a response to the NodeB request in table 2. Other IE carrying similar information can be defined, in other positions.

Solution B:

After the NodeB has executed the TTI switching, it has to inform the CRNC/SRNC about the actual TTI length used for the user data transmission.

The user plane protocol "Uplink for E-DCH" in 25.427 can be extended to carry the TTI length indication, as in FIG. 3.

FIG. 3 shows the definition of the user plane of TS 25.427 (chapter 9.1.89) E-DCH UL DATA FRAME FOR E-DCH TYPE 1. In the example of FIG. 3, a new IE "TTI Length" is introduced in the spare bits in the header (2 spare bits are used, 01: 2 ms TTI; 10: 10 ms TTI; 11: reserved). Other IE carrying similar information can be defined, in other positions. The similar change can apply for E-DCH UL DATA FRAME FOR E-DCH TYPE 2.

Alternatively, a new control plane message, a new or an existing user plane control frame can be used to carry this information.

Solution C:

It may be advantageous if the RNC and NodeB can synchronize that both have the same view on the number of radio links of serving type of each TTI handled in each node. Consistency checks can be added to also provide the information of the current number of radio links in use from the RNC to the RBS and vice versa. This can be done using existing messages or new NBAP messages as above. As the RNC is in control of the admission, the RBS should adapt to the RNC defined current number of users.

These method embodiments are further illustrated in FIG. 2. As FIG. 2 shows, a wireless communication device 206 (exemplified by an UE) is in connection with a RBS 204 (exemplified by a NodeB) and the NodeB 204 is in connection with a RNC 205, for example a situation as illustrated in FIG. 1. FIG. 2 shows a number of actions as follows.

Action 210

In this action, the RBS/NodeB 204 receives, from a wireless communication device, any of:
- a TTI switch trigger that indicates a request from the wireless communication device to switch from operating a radio bearer using the first TTI to operating a radio bearer using the second TTI,
- a TTI switch trigger that indicates a request from the wireless communication device to switch from operating a radio bearer using the second TTI to operating a radio bearer using the first TTI.

Action 212

A request to perform a TTI switch according to the received TTI switch trigger is sent to the RNC 205 in which RNC 205 the request is received. As described above, NBAP: new or existing message (NodeB requests CRNC to determine if the TTI switch is allowed) may be used.

Action 214

The received request is analysed in the RNC 205. In other words, the RNC performs an admission check.

Action 216

A grant to perform the requested TTI switch is sent from the RNC 205 to the RBS/NodeB 204 in which RBS/NodeB 204 the grant is received. As indicated above, this may entail a NBAP: new or existing control plane message (granted TTI).

Action 218

The requested TTI switch is performed by sending an order to the wireless communication device/UE 206 in the form of, e.g., a HS-SCCH order.

Action 220

In some embodiments this action entails that the RBS/NodeB 204 performs:
sending, to the RNC 205, information regarding any of:
  information that the wireless communication device using the first TTI in a radio bearer is to be switched to using the second TTI,
  information that the wireless communication device using the second TTI in a radio bearer is to be switched to using the first TTI.

In some embodiments, the RBS/NodeB 204 may send, to the RNC 205, information regarding any of: information that the first TTI is used in a radio bearer, information that the second TTI is used in a radio bearer.

A corresponding reception may take place in the RNC 205.

For example, in case Iub frame protocol (FP) is used: RBS/NodeB 204 indicates to CRNC the TTI length; if CRNC is not SRNC, Iur FP will be used to indicate to SRNC.

Action 222

A synchronization between the RBS/NodeB 204 and the RNC 205 may entail exchanging information regarding the number of wireless communication devices operating a radio bearer using the first TTI and the second TTI, respectively.

As is evident from the above actions, the words NodeB and RBS are used interchangeably herein to describe a radio network base station. Moreover, as mentioned above, the radio bearer configuration information may in embodiments comprise any of:
- at least one NodeB application part, NBAP, message,
- at least one Iub/Iur frame protocol message,
- at least one control plane message.

Furthermore, as mentioned above, the first TTI may be 2 milliseconds and the second TTI may be 10 milliseconds.

Embodiments of this invention allow both the NodeB and the RNC to be aligned with regard to admission control limitations concerning the number of E-DCH 2 ms and 10 ms TTI users.

Turning now to FIGS. 4 to 8, apparatus and computer program related embodiments will be described in some detail.

Figure 4:
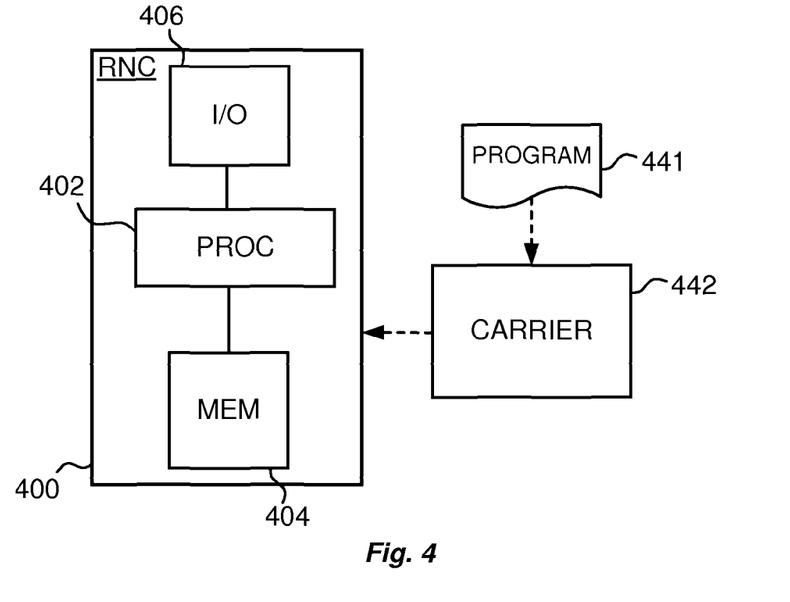
FIG. 4 is a schematic block diagram of a RNC.

FIG. 4 illustrates a RNC 400, which may be the RNC 105 as described above in connection with FIG. 1. The RNC 400 comprises input/output circuitry 406, a processor 402 and a memory 404. The memory 404 contains instructions executable by the processor 402 whereby the RNC 400 is operative to configure at least one radio bearer between a RBS (such as the NodeB 104 in FIG. 1, remembering that a NodeB is an example of a RBS as explained above) and wireless communication devices (such as the UE 106 in FIG. 1, remembering that a UE is an example of a wireless communication device) by:
- receiving, from the RBS, a request to perform a TTI switch according to a TTI switch trigger received by the RBS,
- analysing the received request, and
- sending, to the RBS, a grant to perform the requested TTI switch.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the RNC 400 is operative to configure the radio bearers by:
- receiving, from the RBS, information regarding any of:
  - information that a wireless communication device using a first TTI in a radio bearer is to be switched to using a second TTI,
  - information that a wireless communication device using the second TTI in a radio bearer is to be switched to using the first TTI.

In some embodiments, the RNC 400 is operative to configure the radio bearers by:
- receiving, from the RBS, information regarding any of:
  - information that the first TTI is used in a radio bearer,
  - information that the second TTI is used in a radio bearer.

In some embodiments, the RNC 400 is operative to configure the radio bearers by:
- exchanging, with the RBS, information regarding the number of wireless communication devices operating a radio bearer using the first TTI and the second TTI, respectively.

In some embodiments, the RNC 400 is operative to configure the radio bearers by:
- sending at least one NodeB application part, NBAP, message,
- sending at least one Iub/Iur frame protocol message,
- sending at least one control plane message.

In some embodiments, the first TTI is 2 milliseconds and the second TTI is 10 milliseconds.

Figure 5:
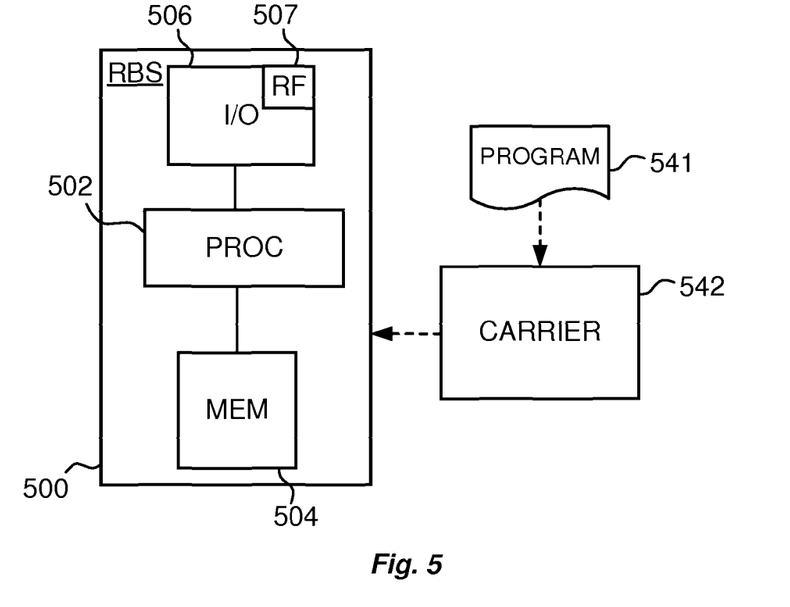
FIG. 5 is a schematic block diagram of a RBS.

FIG. 5 illustrates a RBS 500 which may be the NodeB 104 as described above in connection with FIG. 1. The RBS 500 comprises input/output circuitry 506, part of which is in the form of radio circuitry 507, a processor 502 and memory 504. The memory 504 contains instructions executable by the processor 502 whereby the RBS 500 is operative to configure at least one radio bearer between the RBS 500 and wireless communication devices (such as the UE 106 in FIG. 1) by:
- receiving, from a wireless communication device, any of:
  - a TTI switch trigger that indicates a request from the wireless communication device to switch from operating a radio bearer using a first TTI to operating a radio bearer using a second TTI,
  - a TTI switch trigger that indicates a request from the wireless communication device to switch from operating a radio bearer using the second TTI to operating a radio bearer using the first TTI,
- sending, to a RNC, a request to perform a TTI switch according to the received TTI switch trigger,
- receiving, from the RNC, a grant to perform the requested TTI switch, and
- performing the requested TTI switch.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the RBS 500 is operative to configure the radio bearers by:
- sending, to the RNC, information regarding any of:
  - information that the wireless communication device using the first TTI in a radio bearer is to be switched to using the second TTI,
  - information that the wireless communication device using the second TTI in a radio bearer is to be switched to using the first TTI.

In some embodiments, the RBS 500 is operative to configure the radio bearers by:
- sending, to the RNC, information regarding any of:
  - information that the first TTI is used in a radio bearer,
  - information that the second TTI is used in a radio bearer.

In some embodiments, the RBS 500 is operative to configure the radio bearers by:

exchanging, with the RNC, information regarding the number of wireless communication devices operating a radio bearer using the first TTI and the second TTI, respectively.

In some embodiments, the RBS 500 is operative to configure the radio bearers by:

receiving at least one NodeB application part, NBAP, message, receiving at least one Iub/Iur frame protocol message, receiving at least one control plane message.

In some embodiments, the first TTI is 2 milliseconds and the second TTI is 10 milliseconds.

Figure 6:
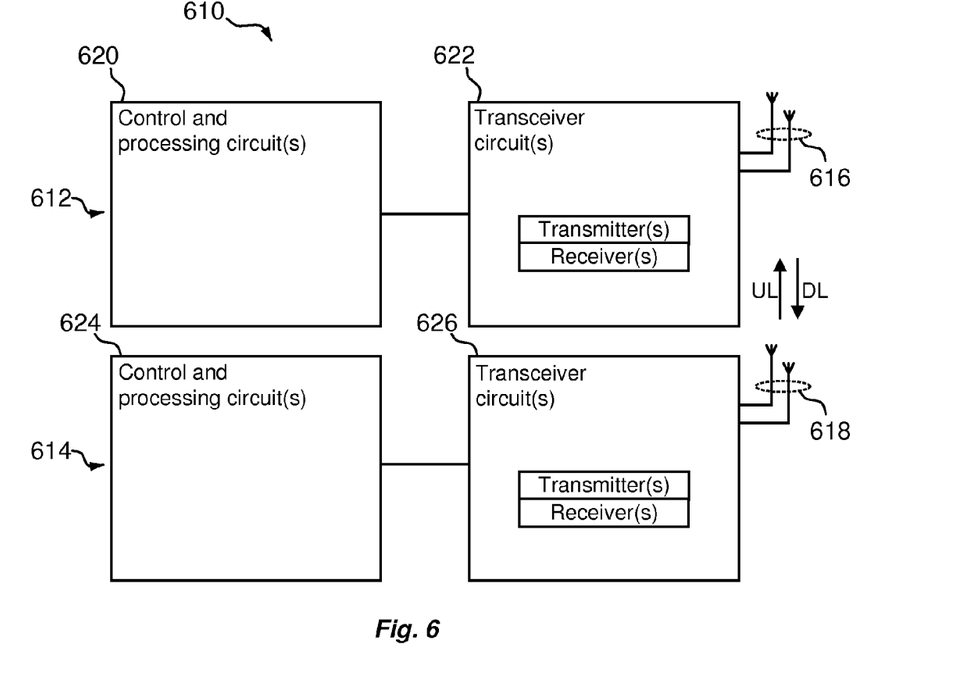
FIG. 6 is a schematic block diagram of a wireless communication system.

FIG. 6 illustrates a system 610 comprising a NodeB 612 and a UE 614. The NodeB 612 comprises a control and processing circuit 620 that are similar in functionality to the processor 502 and memory 504 of the RBS 500 illustrated in FIG. 5. The control and processing circuit 620 is connected to a transceiver circuit 622 that comprises one or more transmitter and one or more receiver, to which an antenna 616 is attached. Similarly, the UE 614 comprises a control and processing circuit 624. The control and processing circuit 624 is connected to a transceiver circuit 626 that comprises one or more transmitter and one or more receiver, to which an antenna 618 is attached. The UE 614 and the NodeB 612 may communicate via an uplink UL and a downlink DL, for example as discussed above in connection with FIGS. 1 to 3.

Figure 7:
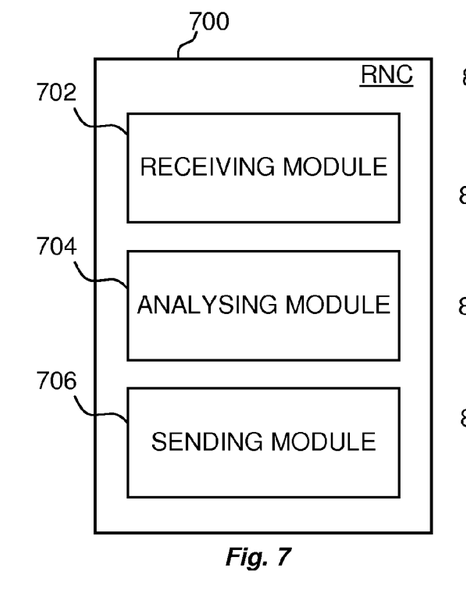
FIG. 7 is a schematic block diagram of a RNC.

FIG. 7 illustrates a RNC 700 that comprises a receiving module 702, an analysing module 704 and a sending module 706. The receiving module 702 is configured to receive, from the RBS, a request to perform a TTI switch according to a TTI switch trigger received by the RBS. The analysing module 704 is configured to analyse the received request. The sending module 706 is configured to send, to the RBS, a grant to perform the requested TTI switch. The RNC 700 may comprise further modules that are configured to perform in a similar manner as, e.g., the RNC 400 described above in connection with FIG. 4.

Figure 8:
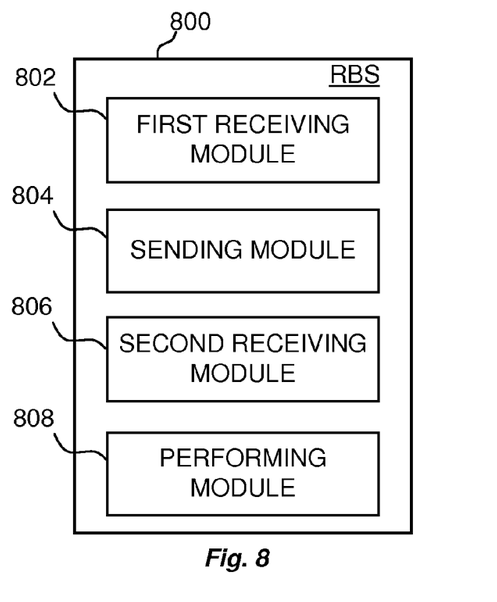
FIG. 8 is a schematic block diagram of a RBS.

FIG. 8 illustrates a RBS 800 that comprises a first receiving module 802, a sending module 804, a second receiving module 806 and a performing module 808. The first receiving module 802 is configured to receive, from a wireless communication device, any of a TTI switch trigger that indicates a request from the wireless communication device to switch from operating a radio bearer using a first TTI to operating a radio bearer using a second TTI, a TTI switch trigger that indicates a request from the wireless communication device to switch from operating a radio bearer using the second TTI to operating a radio bearer using the first TTI.

The sending module 804 is configured to send, to the RNC, a request to perform a TTI switch according to the received TTI switch trigger. The second receiving module 806 is configured to receive, from the RNC, a grant to perform the requested TTI switch. The performing module 808 is configured to perform the requested TTI switch. The RBS 800 may comprise further modules that are configured to perform in a similar manner as, e.g., the RBS 500 described above in connection with FIG. 5.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

TABLE 1

| IE/Group name | Presence | Range | IE Type and Reference | Semantic Description | Criticality | Assigned Criticality |
|---|---|---|---|---|---|---|
| Message Discriminator | M | | 9.2.1.45 | | — | |
| Message Type | M | | 9.2.1.46 | | YES | ignore |
| Transaction ID | M | | 9.2.1.62 | | — | |
| CRNC Communication Context ID | M | | 9.2.1.18 | The reserved value | YES | ignore |

TABLE 1-continued

| IE/Group name | Presence | Range | IE Type and Reference | Semantic Description | Criticality | Assigned Criticality |
|---|---|---|---|---|---|---|
| | | | | "All CRNC CC" shall not be used. | | |
| HS-DSCH FDD Update Information | O | | 9.2.2.18Ea | | YES | ignore |
| E-DCH FDD Update Information | O | | 9.2.2.13DA | | YES | ignore |
| Additional HS Cell Information RL Param Upd | | 0 . . . <maxNrOfHSDSCH-1> | | For secondary serving HS-DSCH cell. Max 7 in this 3GPP release. | EACH | ignore |
| >HS-PDSCH RL ID | M | | RL ID 9.2.1.53 | | — | |
| >HS-DSCH FDD Secondary Serving Update Information | M | | 9.2.2.18Eaa | | — | |
| Additional E-DCH Cell Information RL Param Upd | | 0 . . . <maxNrOfEDCH-1> | | E-DCH on Secondary uplink frequency - max 1 in this 3GPP release. | EACH | ignore |
| >>Additional E-DCH FDD Update Information | M | | 9.2.2.138 | | — | |
| CPC Recovery Report | O | | ENUMERATED (Initiated, . . .) | | YES | ignore |
| UL CLTD State Update Information | O | | 9.2.2.155 | | YES | ignore |
| TTI Switching Permission Request | O | | | | YES | ignore |
| >TTI Switching Request | M | | ENUMERATED (2 ms TTI Requested, 10 ms TTI Requested, . . .) | | — | |
| >E-DCH RL ID | O | | RL ID | | — | |

TABLE 2

| IE/Group name | Presence | Range | IE Type and Reference | Semantic Description | Criticality | Assigned Criticality |
|---|---|---|---|---|---|---|
| Message Discriminator | M | | 9.2.1.45 | | — | |
| Message Type | M | | 9.2.1.46 | | YES | ignore |
| Transaction ID | M | | 9.2.1.62 | | — | |
| CRNC Communication Context ID | M | | 9.2.1.18 | The reserved value "All CRNC CC" shall not be used. | YES | ignore |
| TTI Switching Response | | 0 . . . 1 | | | YES | ignore |
| >TTI Switching granted | M | | ENUMERATED (2 ms TTI granted, 10 ms TTI granted, . . .) | | — | |
| >E-DCH RL ID | O | | RL ID | | — | |

Abbreviations

In the above and in the drawings, effort has been made to explain the abbreviations used. However, any remaining abbreviations find their explanation in the following table:

CFN Connection frame number
CLTD Cell-ID
CPC Continuous Packet Connectivity
CRC Cyclic redundancy check
DDI Data description indicator
E-DCH Enhanced Dedicated Channel
FACH Forward Access Channel
FDD Frequency Division Duplexing
FSN Frame sequence number
FT Frame type
MAC Medium Access Control Protocol
PDU Protocol Data Unit
RB Radio bearer
RL ID Radio link identity

The invention claimed is:

1. A method, performed by a radio network controller (RNC) for configuring at least one radio bearer between a radio base station (RBS) and wireless communication devices, the method comprising:
   receiving, from the RBS, a request to perform a transmission time interval (TTI) switch according to a TTI switch trigger received by the RBS from a wireless communication device;
   analysing the received request;
   sending, to the RBS, a grant to perform the requested TTI switch; and
   receiving information from the RBS regarding any of:
      information that the wireless communication device using a first TTI in a radio bearer is to be switched to using a second TTI; and
      information that the wireless communication device using the second TTI in a radio bearer is to be switched to using the first TTI.

2. The method of claim 1, comprising receiving information from the RBS regarding any of:
   information that the first TTI is used in a radio bearer; and
   information that the second TTI is used in a radio bearer.

3. The method of claim 1, comprising exchanging information with the RBS regarding the number of wireless communication devices operating a radio bearer using the first TTI and the number of wireless communication devices operating a radio bearer using the second TTI.

4. The method of claim 1, wherein, for configuring the at least one radio bearer between the RBS and the wireless communication devices, the method further comprises sending radio bearer configuration information to the RBS comprising any of:
   sending at least one NodeB application part (NBAP) message;
   sending at least one Iub/Iur frame protocol message; and
   sending at least one control plane message.

5. The method of claim 1, wherein the first TTI is 2 milliseconds and the second TTI is 10 milliseconds.

6. A method performed by a radio base station (RBS), for configuring at least one radio bearer between the RBS and wireless communication devices, the method comprising:
   receiving, from a wireless communication device, any of:
      a transmission time interval (TTI) switch trigger that indicates a request from the wireless communication device to switch from operating a radio bearer using a first TTI to operating a radio bearer using a second TTI; and
      a TTI switch trigger that indicates a request from the wireless communication device to switch from operating a radio bearer using the second TTI to operating a radio bearer using the first TTI; and
   sending to a radio network controller (RNC) a request to perform a TTI switch according to the received TTI switch trigger;
   receiving a grant from the RNC to perform the requested TTI switch; and
   performing the requested TTI switch.

7. The method of claim 6, comprising sending information to the RNC regarding any of:
   information that the wireless communication device using the first TTI in a radio bearer is to be switched to using the second TTI; and
   information that the wireless communication device using the second TTI in a radio bearer is to be switched to using the first TTI.

8. The method of claim 6, comprising sending information to the RNC regarding any of:
   information that the first TTI is used in a radio bearer; and
   information that the second TTI is used in a radio bearer.

9. The method of claim 6, comprising exchanging information with the RNC regarding the number of wireless communication devices operating a radio bearer using the first TTI and the number of wireless communication devices operating a radio bearer using the second TTI.

10. The method of claim 6, wherein the reception of the radio bearer configuration information comprises any of:
    receiving at least one NodeB application part (NBAP) message;
    receiving at least one Iub/Iur frame protocol message; and
    receiving at least one control plane message.

11. The method of claim 6, wherein the first TTI is 2 milliseconds and the second TTI is 10 milliseconds.

12. A radio network controller (RNC) comprising input/output circuitry, a processor and a memory, said memory containing instructions executable by said processor, whereby said RNC is operative to configure at least one radio bearer between a radio base station (RBS) and wireless communication devices, based on being configured to:
    receive a request from the RBS to perform a transmission time interval (TTI) switch according to a TTI switch trigger received by the RBS from a wireless communication device;
    analyse the received request;
    send a grant to the RBS, to perform the requested TTI switch; and
    receive information from the RBS regarding any of:
       information that the wireless communication device using a first TTI in a radio bearer is to be switched to using a second TTI; and
       information that the wireless communication device using the second TTI in a radio bearer is to be switched to using the first TTI.

13. A radio base station (RBS) comprising radio circuitry, a processor and a memory, said memory containing instructions executable by said processor whereby said RBS is operative to configure at least one radio bearer between the RBS and wireless communication devices, based on being configured to:
    receive from a wireless communication device any of:
       a transmission time interval (TTI) switch trigger that indicates a request from the wireless communication device to switch from operating a radio bearer using a first TTI to operating a radio bearer using a second TTI; and a TTI switch trigger that indicates a request from the wireless communication device to switch from operating a radio bearer using the second TTI to operating a radio bearer using the first TTI; and send, to a radio network controller (RNC), a request to perform a TTI switch according to the received TTI switch trigger;

receive a grant from the RNC to perform the requested TTI switch; and perform the requested TTI switch.

14. A non-transitory computer-readable medium storing a computer program comprising instructions which, when, executed on at least one processor in a radio network controller (RNC), configures the RNC to configure at least one radio bearer between a radio base station (RBS) and wireless communication devices, based on said computer program comprising program instructions configuring the RNC to:

receive a request from the RBS to perform a transmission time interval (TTI) switch according to a TTI switch trigger received by the RBS from a wireless communication device;

analyse the received request;

send a grant to the RBS, to perform the requested TTI switch; and receiving information from the RBS regarding any of:

information that the wireless communication device using a first TTI in a radio bearer is to be switched to using a second TTI; and information that the wireless communication device using the second TTI in a radio bearer is to be switched to using the first TTI.

15. A non-transitory computer-readable medium storing a computer program comprising instructions which, when executed on at least one processor in a radio base station (RBS), configures the RBS to configure at least one radio bearer between the RBS and wireless communication devices, based on said computer program comprising program instructions configuring the RBS to:

receive from a wireless communication device any of:

a transmission time interval (TTI) switch trigger that indicates a request from the wireless communication device to switch from operating a radio bearer using a first TTI to operating a radio bearer using a second TTI; and a TTI switch trigger that indicates a request from the wireless communication device to switch from operating a radio bearer using the second TTI to operating a radio bearer using the first TTI; and send, to a radio network controller (RNC), a request to perform a TTI switch according to the received TTI switch trigger;

receive a grant from the RNC to perform the requested TTI switch; and perform the requested TTI switch.

* * * * *

UNITED STATES PATENT AND TRADEMARK OFFICE
CERTIFICATE OF CORRECTION

PATENT NO. : 9,756,615 B2  
APPLICATION NO. : 14/354863  
DATED : September 5, 2017  
INVENTOR(S) : Shi et al.

Page 1 of 1

It is certified that error appears in the above-identified patent and that said Letters Patent is hereby corrected as shown below:

On the Title Page

In Item (54), in "Title", in Column 1, Line 1, delete "TTI SWITCHING" and insert -- MANAGING TRANSMISSION TIME INTERVAL SWITCHING IN A WIRELESS COMMUNICATION SYSTEM --, therefor.

In the Drawings

In Fig. 2, Sheet 2 of 5, for Tag "222", insert -- synchronization between the RBS/NodeB 204 and the RNC 205 --.

In the Specification

In Column 13, Line 7, delete "Cell-ID" and insert -- Closed Loop Transmit Diversity --, therefor.

In Column 13, Line 16, delete "Control Protocol" and insert -- Control --, therefor.

Signed and Sealed this  
Tenth Day of April, 2018

Andrei Iancu  
*Director of the United States Patent and Trademark Office*